United States Patent [19]

Pontefract

[11] Patent Number: 4,525,624
[45] Date of Patent: Jun. 25, 1985

[54] DATA LOGGING DEVICE

[75] Inventor: Ronald M. Pontefract, York, England

[73] Assignee: Rowntree Mackintosh plc, York, England

[21] Appl. No.: 417,502

[22] Filed: Sep. 13, 1982

[30] Foreign Application Priority Data

Sep. 15, 1981 [GB] United Kingdom ............... 8127857

[51] Int. Cl.$^3$ ............................................. G06K 15/00
[52] U.S. Cl. ..................................... 235/383; 364/189
[58] Field of Search .................... 235/383, 419, 489; 340/709; 364/189

[56] References Cited

U.S. PATENT DOCUMENTS 3,997,891 12/1976 Iwamura .............................. 340/703
4,303,973 12/1981 Williamson ........................ 364/189
4,415,065 11/1983 Sandstedt ............................ 235/383

FOREIGN PATENT DOCUMENTS

2915378 10/1980 Fed. Rep. of Germany .

Primary Examiner—Harold I. Pitts
Attorney, Agent, or Firm—Kemon & Estabrook

[57] ABSTRACT

To allow a salesman to record data relating to merchandise items which are to be ordered, a logging device comprises a casing in which are housed a keyboard, a display and associated circuits. The salesman locates a sheet containing a list of merchandise items, on the casing between two columns of light-emitting diodes. At the start of entry of an order, the top left-hand LED is illuminated under the control of a central processor unit, which simultaneously addresses a main memory storage location corresponding to the item alongside that LED. Data, such as quantity required, can then be keyed into that storage location, which already contains an identification code for that item. The salesman then operates a key which causes the CPU to scan through the LEDs, and the storage locations, in turn, until the next required item on the sheet is reached. Data relating to that item is then keyed-in. At the end of each day, the salesman couples a transducer to a public telephone and transmits the data to a computer at his base. Due to the automatic correspondence, at any instant, between the item indicated by an LED and the respective storage location containing the item identity code, the items can be listed in plain language and the salesman does not have to look up item codes. The order can, therefore, be entered rapidly and transmitted back to base without danger of incorrect codes being used.

12 Claims, 5 Drawing Figures

DATA LOGGING DEVICE

BACKGROUND OF THE INVENTION

1. Field of the Invention

This invention relates to a portable data logging device for use particularly, but not exclusively, by salesmen when taking orders on a customer's premises, or merchandisers taking stock.

2. Description of the Prior Art

In the past, a salesman engaged in taking orders for goods at customer's premises has had the task of writing down each type of product required (or making an entry against items on a preprinted form), the quantity required and the required delivery date. At the end of the working day it has then been necessary for the salesman to provide details of all the day's orders to staff at the salesman's base so that the orders can be processed. This has entailed returning to base, or reading the orders out during a long telephone call, or sending the orders to base by mail.

More recently, electronic logging devices have been produced which will store product orders which are entered via the keyboard by the salesman, but such devices have either required the inclusion of a product code in each entry, or the memory has had to be searched for codes stored in a predetermined manner. It has been necessary for the salesman to look up the codes during entry of the orders, or to read all of the product codes out of the memory, in sequence, until a desired product is reached, as seen on a display in mnemonic form. In either case, the entry of an order is a long operation, particularly if the Company sells many products.

SUMMARY OF THE INVENTION

It is an object of the present invention to provide an electronic logging device which will store data relating, for example, to orders for products, and in which insertion of codes identifying items being entered is effected automatically by addressing an easily-read list.

According to the invention, a data logging device comprises data storage means; a keyboard for use by an operator to enter data into the storage means; means to display a list from which items are to be selected; scanning means operable to select the listed items and simultaneously to address corresponding storage locations of the storage means, the locations containing identifying codes for the respective items; and means controllable by the operator to arrest the scanning when a selected item is indicated, whereby data relating to that item can be entered into the corresponding storage location via the keyboard.

Preferably, the items are listed in plain language.

The scanning means may include a plurality of light-emitting diodes, a respective one for each listed item, for indicating the items. The scanning means may also be operable to move to the next listed item in response to actuation of a key by the operator.

BRIEF DESCRIPTION OF THE DRAWING

One embodiment of the invention will now be described, by way of example, with reference to the accompanying drawings, in which.

DESCRIPTION OF THE PREFERRED EMBODIMENTS

Figure 1:
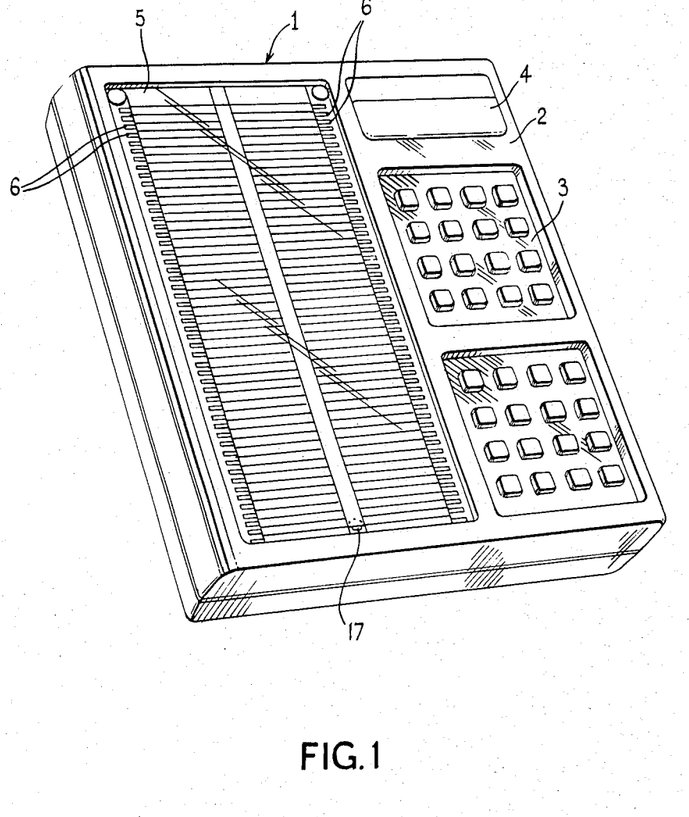
FIG. 1 is a pictorial view of a portable data logging device.

Referring to FIG. 1, the logging device is contained within a plastics casing 1 having a front panel 2. A keyboard 3, comprising 32 keys arranged in two groups, is located at one side of the front panel, with a 16-digit LED alphanumeric display 4 above it. The left-hand side of the panel is recessed to hold a sheet 5 on which are listed up to a hundred items of merchandise for ordering by customers, the items being set out in two columns, and being described on the sheet in plain language. The sheet 5 may be removed, and successive sheets carrying different items may be substituted. Alongside each item position is a respective LED 6.

The casing contains the electronic circuitry of the device and a rechargeable battery pack for supplying power to the device.

Figure 2:
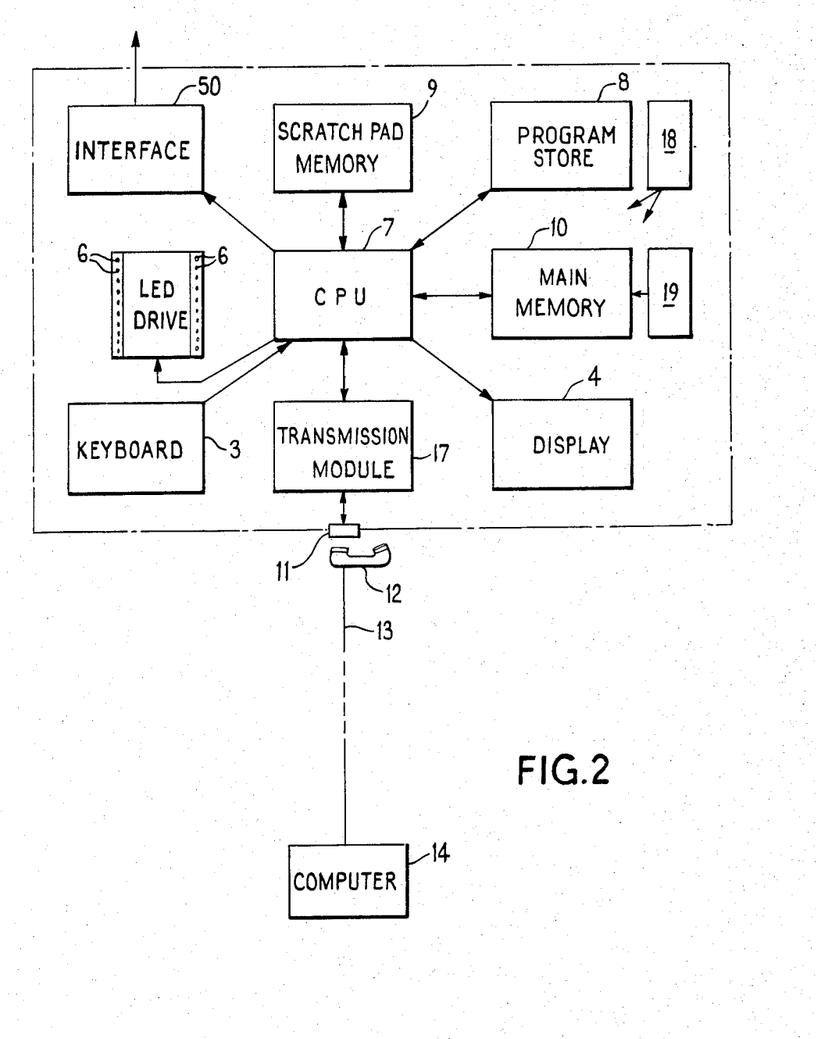
FIG. 2 is a schematic block diagram of the device.

A schematic block diagram of the circuitry is shown in FIG. 2. The basis of the device is a central processing unit (CPU) 7 which is connected to a program store 8, a scratch pad memory 9, and a main memory 10 with a cumulative store. The CPU 7 processes data from the keyboard 3, and controls the operation of the display 4 and the LEDs 6. It includes an internal timer to "time-out" the display 4 after three seconds. Data can be outputted from the memories 9 and 10 and fed via an acoustic coupler 11 to a telephone handset 12 and thence over a public telephone line 13 to a central computer 14 at the headquarters of the sales organisation.

The memories may be as follows; program store 8, a CMOS reprogrammable ROM of 2K 8-bit bytes capacity; the scratch pad memory 9, a CMOS RAM of 1K 8-bit bytes capacity; the main memory 10, a CMOS RAM of 7K 8-bit bytes capacity.

Figure 3:
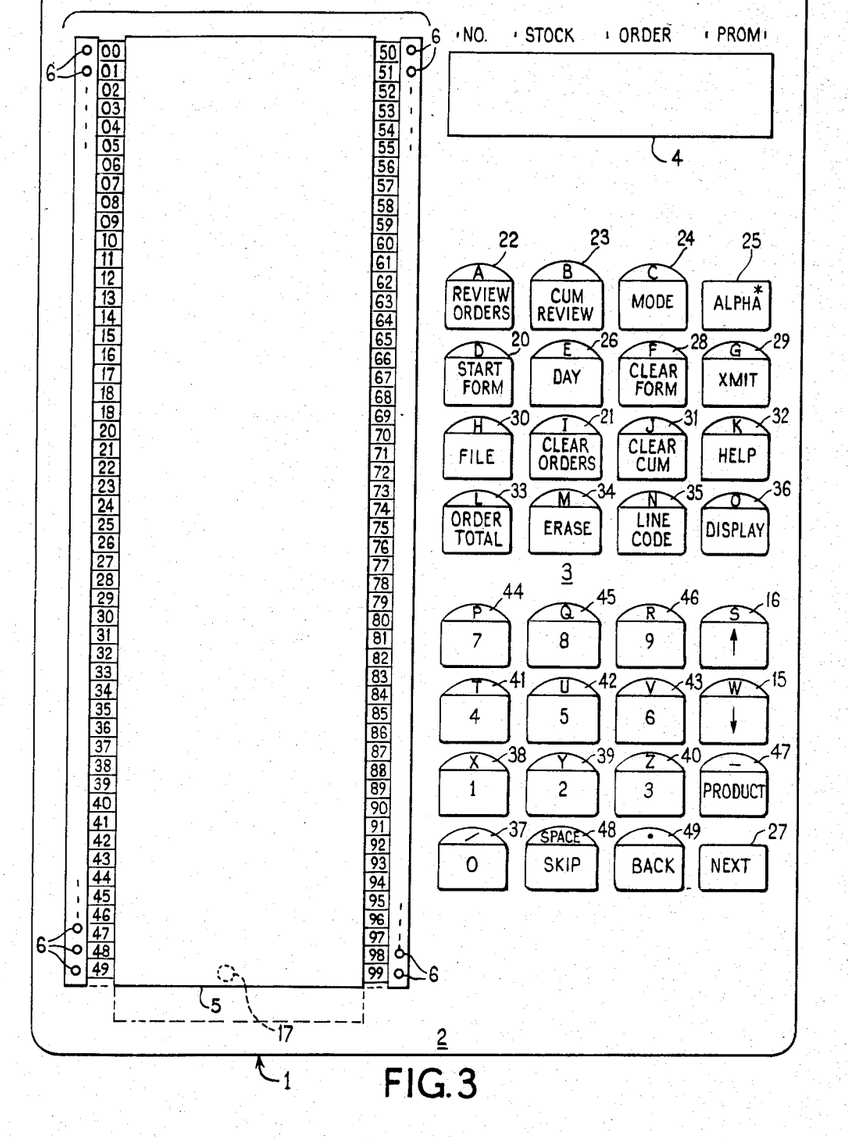
FIG. 3 illustrates the layout of a keyboard of the device.

The layout of the keyboard is shown in FIG. 3. The function of certain of the keys will be explained later.

The basic operation of the device is as follows. At the start of an order, the salesman presses a "START FORM" key 20, which enables the circuits, and causes the top LED 6 in the left-hand column to be illuminated. He then enters a code into the CPU 7 via the keyboard 3 to identify the particular customer. He selects a relevant merchandise sheet 5 for that customer, and enters a code, via the keyboard, to identify the sheet. He can then enter any other relevant information, such as order date and order reference number. If the customer requires the item indicated by the top LED, the salesman enters on the keyboard the quantity required, and that quantity is automatically stored in a particular location of the scratch pad memory which is allocated to that item and which is selected by the CPU on the basis of the sheet identity code and the position of the illuminated LED 6. The salesman then momentarily presses a key 15 on the keyboard to cause the CPU 7 to energise the next LED in the column and to address the corresponding scratch pad memory location. If that item is not required, the salesman maintains pressure on the key so that illumination of the LEDs moves sequentially down to that LED corresponding to the next required item. He then releases the key. The salesman enters the quantity of that item required and selects the next required item by again operating the key 15. If he wishes to scan back to an item higher up the column he presses a key 16, or if he wishes to move across to the other column he either presses both keys 15 and 16 simultaneously or holds the key 15 or the key 16 down so that the illumination of the LEDs travels to the end of the current column and then shifts to the other column.

It will be apparent that the LEDs act, in effect, as an illuminated "cursor" for indicating the listed items one at a time, and the cursor is movable up or down by the keys 16 and 15, respectively.

When all required items on that side of the sheet 5 have been ordered, the sheet can be turned over to reveal a new set of up to 100 items. A sensor 17 (e.g. a photo-transistor), mounted in the recess adjacent the base of the sheet 5, cooperates with a suitable marking on one side of the sheet to tell the CPU 7 which side of the sheet is in use, so that the CPU can address the correct storage locations for the items on that side of the sheet.

When the order has been completed, a "FILE" key 30 is pressed to move the content of the scratch pad memory 9 into the main memory 10 and to clear the scratch pad memory ready for the next order. If necessary, the orders committed to the main memory 10 can be accessed so that the data stored therein can be viewed on the display 4 and any necessary amendments can be made.

At the end of the day, the acoustic coupler 11 is coupled to a convenient telephone handset 12 of the public telephone network and the data relating to the day's orders are read out of the main store 10 via a transmission module 17 and are fed over the line 13 to the computer 14, preferably in half-duplex mode.

In order to avoid loss of the data from the volatile main memory 10 in the event of failure of the main battery supply 18, a separate back-up battery 19 is provided for that memory.

The data are also fed to the cumulative store of the main memory 10 so that the salesman has a record of his sales achievement over the past month. The working store of the main memory is then cleared, by pressing a "CLEAR ORDERS" key 21, ready for the next day.

It is considered that it will be obvious to those skilled in the art what kind of circuitry is necessary to fulfil the required functions. Suitable circuitry is, therefore, not described in detail herein.

The functions of the keys are as follows.

| | |
|---|---|
| REVIEW ORDERS (key 22) | This enables the salesman to examine a complete order before pressing the "CLEAR ORDERS" key 21. The items will be displayed sequentially on the display 4. The first depression of this key displays the number of orders in the device. |
| CUMULATIVE REVIEW (key 23) | This provides access to the cumulative store of the main memory 10, so that the accumulated total for each product is displayed in turn. The first depression of this key displays the total of all products. |
| MODE (key 24) | If more than one program is contained in the program store 8, this key allows selection of a particular program. |
| ALPHA (key 25) | This converts the operation of the keys so that they can input the alpha characters marked on the tops of the keys. The key will be latched down and illuminated until it is cancelled by pressing it again. |
| START FORM (key 20) | As explained previously, this brings up, in effect, a new "order form" and sets the cursor at the top left-hand item. |
| DAY (key 26) | This enables any constants to be entered once per day as opposed to entering them on every "order form". For example, salesman's number and date may be entered. A "NEXT" key 27 is pressed after the "DAY" key in order to enter each new constant. |
| CLEAR FORM (key 28) | This empties the scratch pad memory 9. |
| TRANSMIT (key 29) | Initiates transmission via the acoustic coupler 11 subject to acceptable criteria. All other keys are inoperable during transmission. Transmission cannot occur if there is still an order in the scratch pad memory 9. This is to avoid the last order of the day not being put into the main memory. |
| FILE (key 30) | This moves the contents of the scratch pad memory 9 into the main memory 10 |
| CLEAR ORDERS (key 21) | This clears the working store of the main memory 10 after the store data have been transmitted to the computer 13. |
| CLEAR CUM (key 31) | This clears the cumulative store of the main memory 10. |
| HELP (key 32) | This causes a message to be shown on the display 4 to indicate what point the salesman has reached in the order. It is useful, in particular, if the data logging device has been switched off and then re-used. A second depression of the key causes the device to revert to normal operation. |
| ORDER TOTAL (key 33) | Causes the display 4 to show the total products ordered from the start of the order to pressing the key, irrespective of the product type. |
| ERASE (key 34) | For each depression, this erases the last character entered and moves the cursor back one item. |
| LINE CODE (key 35) | This allows entry of codes relating to merchandise items. |
| DISPLAY (key 36) | This initiates a diagnostic test of the system, and causes the display 4 to indicate the amount of unused storage capacity in the main memory 10 and the state of the batteries. |
| 1-9 (keys 37-46) | For entering numerical values, such as quantities. |
| CURSOR MOVE KEYS (keys 15 and 16) | For moving the cursor up or down the product list as previously explained. Keeping one key depressed, the cursor moves up or down the list, stopping when the key is released. Single 'stab' depressions of the keys move the cursor by one product. A single 'stab' depression of both cursor keys together moves the cursor horizontally from one column to the other, i.e. if cursor is against 26th product in the left-hand column, it would move across to the 26th product in the right-hand column, and vice versa. |
| PRODUCT (key 47) | This is used to move the cursor instantaneously to a particular product number instead of allowing it to scan through the products sequentially. For example, depressing the "PRODUCT" key followed by numerical keys 38 then 37 will move the cursor to the tenth product. |
| SKIP (key 48) | Display character address as indicated by the display cursor will skip to the first character of the following display field e.g. from the stock to the order quantity field. This does not apply to certain "fixed" fields. |
| BACK (key 49) | This has the opposite effect to the "NEXT" key 27. |
| NEXT | Used to display next line of data |

| (key 27) | already in scratch pad memory. Repeatedly pressing this key will step through lines in the memory in order. Also used for stepping through ORDER SUPERSTRUCTURE routine (see below). |

Steps in the use of the device will now be described in greater detail.

(a) After switching the power on and pressing the START FORM key 20, the LED 6 will be illuminated next to the product in the top left-hand corner of the sheet 5. This LED can be used as a 'power on' indicator.

(b) Press and release "DISPLAY" key 36. Wait for TEST COMPLETE on the display 4.

(c) Press and release "NEXT" key 27. 'LO' will appear in the first two positions on the diplay. A space is left automatically in the third position. Thirteen digits can be keyed in, giving territory and ledger outlet, the last digit being a check digit.

(d) Press and release "NEXT". If (c) is acceptable to the stored program, "CALL CODE" will appear on the display 4. A digit or X can be keyed in. Usually '1' would be keyed in but second, third or subsequent orders for the same ledger outlet would be '2', '3', '4' etc. 'X' indicates an urgent order, and 'O' indicates an order to be cancelled. If (c) is not acceptable, 'LO' will appear again.

(e) Press and release "NEXT". 'FORM NUMBER' will appear. Two digits have to be keyed in giving the form number in use, i.e. the identifying number of the sheet 5.

(f) Press and release "NEXT". 'ORDER DATE' will appear. Two digits for day and two for month are keyed in.

The above four steps are obligatory, i.e. each must be dealt with completely before moving on. The remainder are optional, except for AUTO-SKIP.

(g) Press and release "NEXT". 'DEL DATE' will appear (entry same as 'order date'). C or S in the last position denotes "week commencing" or a specific day.

(h) Press and release "NEXT". 'CR' will appear. Up to fourteen alphanumeric characters can be entered, giving customer reference number for the order.

(i) Press and release "NEXT". 'SI' will appear. Up to fourteen alphanumeric characters can be keyed in.

(j) Press and release "NEXT". 'SI2' will appear. Thirteen further alphanumeric characters can be keyed in, if necessary, giving a total of twenty-seven characters for special instructions.

(k) Press and release "NEXT". 'DR' will appear, indicating when deliveries can or cannot be made, '1' indicating deliveries can be made, '0' indicating they cannot. The spaces are labelled "Monday a.m." to "Friday p.m.", "lunchtime" and "Saturday" on the plastic cover of the display 4. If the field is not completed it will be assumed that deliveries can be made at any time or as previously agreed.

(l) Press and release "NEXT". 'AUTO-SKIP' will appear asking if the cursor of the display 4 should automatically skip the stock field to the order quantity field. Y for yes, or N for no, should be entered. This is an obligatory field.

If stocktaking is done prior to taking the order, the following sequence is followed.

(a) Press appropriate CURSOR MOVE key 15 or 16 as necessary and when the required product is reached, the product number will show in the display, together with 1 or 2 to show which side of the sheet 5 is being used. On depressing the START FORM key 20 the top left product LED 6 will be on, and that product number will be displayed.

(b) Enter the quantity of stock by pressing the appropriate numeric keys 37–46.

(c) Repeat these operations until stocktaking is complete, using the CURSOR MOVE keys as described above.

The procedure for entering ordered quantities is as for stocktaking described above. On accessing the product, the display will show the stock quantity (if any) and the display cursor will be in the ORDER field of the display. The order quantity can be entered via the numeric keys 37–46.

If no stock quantity was entered previously, the STOCK field will show nothing and the user will press "SKIP" and proceed as above.

If auto-skip is in operation, the cursor will already be at the order quantity field, i.e. no stock details will be taken.

After entering the order quantity for a product, a field of three digits is available for the entry of any promotion number or other special details of a particular line. If such special details are relevant to the selected product, the user will enter the order quantity as described and then press 'SKIP' to enter the special details.

Whilst taking an order, it is useful to know the number of outers ordered so far, in order to check against quantity price rates. At any time during order taking, this can be done by pressing and releasing the ORDER TOTAL key 33. This would show in the display the total outers ordered so far and extinguish the cursor on the product list (totals for two different product groupings are shown).

To revert to ordering, pressing and releasing either CURSOR MOVE key 15 or 16 would extinguish the two totals on the display 4, bring back the cursor to its position just prior to pressing the ORDER TOTAL key and would bring up the relevant page and product number (and any stock, order and special details already input for that product) in the display. The salesmen would then continue ordering in the normal way.

When the user has completed taking the order and has satisfied himself that everything is correct, he will press the CLEAR FORM key 28. Pressing this key commits the data from the scratch pad memory 9 to the main memory 10. Once this is done, the order can be recalled for checking and can be altered and returned to the main memory. The data must be returned to the main memory before transmission of the data can begin. To examine a complete order before pressing the CLEAR FORM key, the user returns to the start of the order by pressing the REVIEW ORDERS key 22 and and repeatedly depressing the NEXT key 27.

As described previously, part of the main memory 10 is reserved for storing cumulative order totals for each product automatically. Access to this information can be obtained by depressing the CUMULATIVE REVIEW key 23 and depressing the relevant cursor key 15 or 16 to call up a particular product in the normal way. A complete check of the cumulative orders for all products appertaining to a particular customer can be obtained by repeatedly depressing the NEXT key 27. All cumulative totals are cleared by pressing the CLEAR CUM key 31.

In order to review and/or change an order already in the main memory 10, the order can be recalled by entering the territory, ledger and outlet against 'LO' in the display. Successive depressions of the NEXT key 27 would sequence through the superstructure and order. If any changes are desired, the ERASE key 34 is pressed, and the amended information entered.

The salesman may require two types of review:

(a) reviewing the "stock and order situation" for each line to highlight any products overlooked. This would be done ten products at a time (illuminating up to ten of the LEDs 6), but the actual number of items in stock or ordered for any one of the ten products would not be given at this stage;

(b) going through the products ordered so far, one by one, giving page, product number, stock, order and promotion details in the display. This could either be started from wherever the product cursor happens to be, going through the products ordered in sequence; or the salesman could set the cursor at product 00 on page 1 of sheet 5, and progress from there. This type of review would carry on through the pages and would be achieved by using the NEXT key 27.

In order to transmit the data to the computer 14, a specific telephone number is dialled to contact the computer. A tone is sent back from the computer. The XMIT key 29 is pressed and the display 4 shows XMITTING. The telephone handset 12 is placed on the acoustic coupler 11. Following initial handshake routines, a whole order at a time is transmitted, checked and acknowledged.

If the device has difficulty in transmitting due to a bad line, it will try up to four times to send a particular message. If there is still a problem, the display 4 will show XMIT FAILED. Following XMIT FAILED the telephone number needs to be redialled for another attempt. When all transmission has been successfully completed and acknowledged as correct, the display will show XMIT COMPLETE, and the telephone handset can be replaced on its stand.

The device includes an interface 50 for feeding data from the main memory 10 into peripheral devices such as printers, visual display units, wand readers or storage means such as floppy disc stores.

The device can be quite small and portable (e.g. 200×175×40 mm) and avoids all of the salesman's paperwork which is normally associated with the collection and processing of orders. It can weigh about 1 kg. including batteries.

Although the sheet 5 is described as displaying lists of goods, it will be clear that other items could be listed, for example expense items which are being claimed. Furthermore, the need for replacing sheets 5 and keying-in codes identifying the sheets could be overcome by providing a book having hinged pages listing all of the available products. The width of two pages when opened out would be equivalent to the sheet 5. It would then be necessary for the device to detect which pages were in use at any instant, and this could be achieved by providing a light sensor which would receive ambient light through the pages. The amount of light reaching the sensor would be dependent upon the number of pages in front of the sensor, so this would give an indication of the page numbers in use. However, it would also be dependent upon the brightness of the ambient light, so it would be necessary to provide a further sensor, upon which the ambient light would impinge directly, and a comparator, so that changes in the brightness of the ambient light could be taken into account.

Figure 4A:
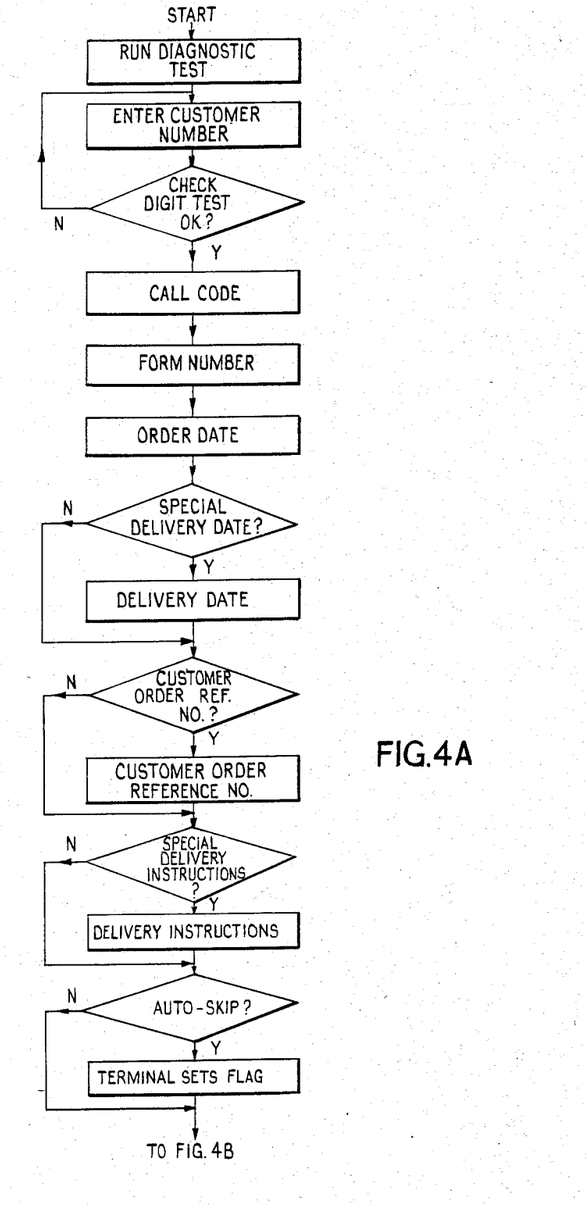
FIGS. 4A and 4B together form a flow chart illustrating the entry of customers' orders for goods.
Figure 4B:
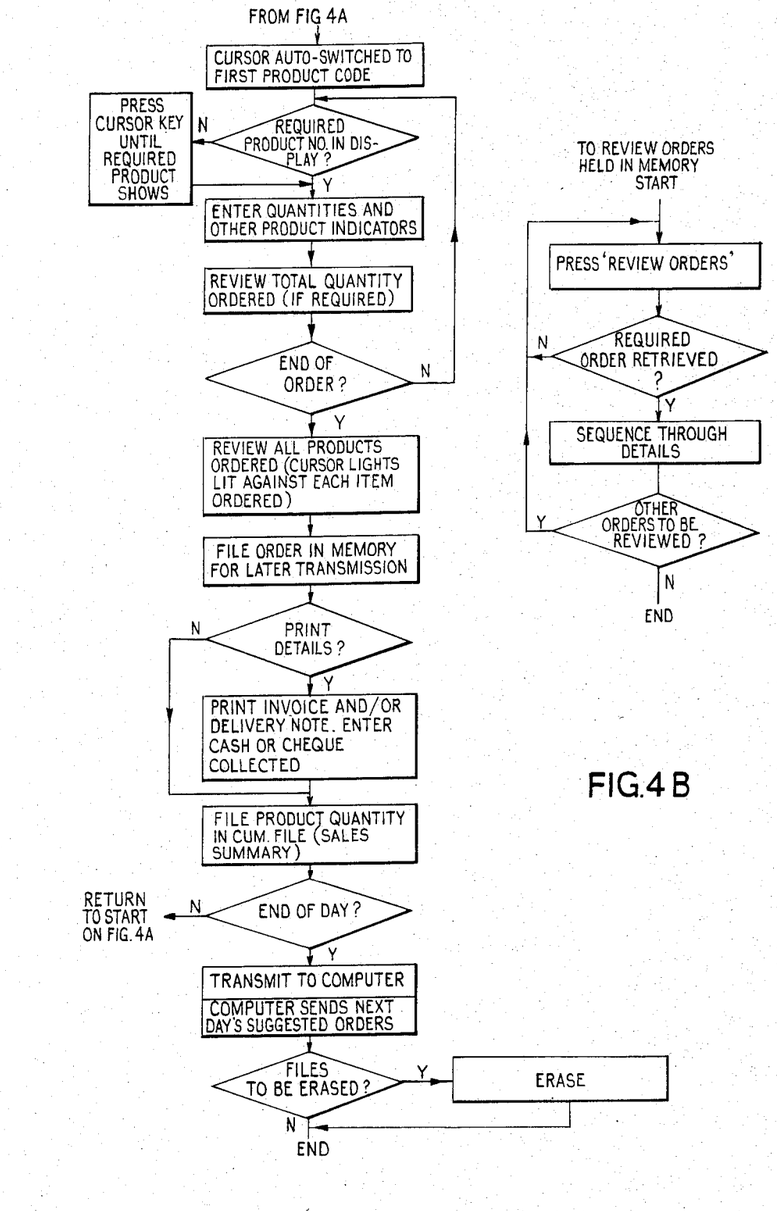

A typical flow chart is shown in FIGS. 4A and 4B.

Although the list is described above as being contained on a sheet or sheets on which the items are set out in written or printed form, the list could alternatively be shown on an electronic display (e.g. LCD) which could occupy the area of the front panel 2 which was allocated to the sheet 5 in the FIG. 1 embodiment.

I claim:

1. A portable data logging device, comprising data storage means; means to display a list from which items are to be selected and which can be replaced by another list external to the device from a portfolio of lists of given format without reference to any program of said device; means coupled to said storage means and operable to select and indicate item positions of said displayed list and to address a storage location of said storage means, allocated to said selected item position, which location stores an identifying code for said item position; and a keyboard coupled to said storage means and operable by an operator to enter into said storage means data relating to said indicated item position; wherein said means to select and indicate item positions is operable under the control of said operator to select said item positions sequentially or randomly without reprogramming said device; and wherein there is provided means operable by said operator to enter into said storage means an identity code for the particular list displayed.

2. A device as claimed in claim 1, wherein the means to select and indicate item positions is also operable to move to the next listed item in response to actuation of a key on the keyboard by the operator.

3. A device as claimed in claim 1, wherein the storage means is operable to accumulate totals of data fed thereto relating to respective items.

4. A device as claimed in claim 1, including an alphanumeric display on which data to be fed to the storage means and/or contained therein can be displayed.

5. A device as claimed in claim 1, wherein power is supplied by a main battery; wherein the data storage means is at least partly volatile; and wherein a back-up battery is provided for supplying power to the volatile part of the data storage means.

6. A device as claimed in claim 1, including an interface for feeding data from the data storage means to a peripheral device.

7. A device as claimed in claim 1, including a transducer for coupling to a telephone for transmission of stored data from the data storage means to a remote receiver over a telephone transmission line.

8. A device as claimed in claim 1, wherein said means to display a list comprising a sheet on which said list is displayed, said sheet, in use, being located on a prescribed area of said device for cooperation with indicators of said means to select and indicate item positions.

9. A device as claimed in claim 8, wherein said indicators comprise a plurality of light-emitting diodes, a respective one for each item position of the displayed list, for indicating the selected item positions.

10. A device as claimed in claim 1, wherein in response to an operator instruction said means to select and indicate item positions is operable, after data relating to a plurality of items have been entered into said storage means, to cause said data to be displayed.

11. A device as claimed in claim 1, further comprising means selectively operable to cause said means to select and indicate item positions to move directly from one item position to any other item position as commanded by said operator.

12. A device as claimed in claim 1, further comprising means to store at least two programs for controlling operation of the device; and switching means operable by said operator to switch from one to another of the programs.

* * * * *